(12) United States Patent
Kacel

(10) Patent No.: US 10,341,135 B2
(45) Date of Patent: Jul. 2, 2019

(54) ZONE CONTROL SYSTEM FOR CONVEYOR SYSTEM

(71) Applicant: Nova-Tron Controls Corp., Alpena, MI (US)

(72) Inventor: Richard J. Kacel, Lincoln, MI (US)

(73) Assignee: Nova-Tron Controls Corp., Alpena, MI (US)

( * ) Notice: Subject to any disclaimer, the term of this patent is extended or adjusted under 35 U.S.C. 154(b) by 417 days.

(21) Appl. No.: 14/983,764

(22) Filed: Dec. 30, 2015

(65) Prior Publication Data

US 2017/0195164 A1    Jul. 6, 2017

(51) Int. Cl.
*H04L 12/40* (2006.01)

(52) U.S. Cl.
CPC .... *H04L 12/40* (2013.01); *H04L 2012/40215* (2013.01)

(58) Field of Classification Search
CPC ........... H04L 41/0213; H04L 29/08072; H04L 29/06; H04L 41/22; H04L 41/12; B65G 43/10; B65G 43/08; B65G 37/02; B65G 47/261; B65G 47/31
USPC ........................................................ 709/223
See application file for complete search history.

(56) References Cited

U.S. PATENT DOCUMENTS

| | | | | |
|---|---|---|---|---|
| 6,035,999 A * | 3/2000 | Hall | ...................... | B65G 13/06 198/781.06 |
| 2004/0003982 A1* | 1/2004 | Tachibana | .............. | B65G 43/10 198/348 |
| 2004/0111339 A1* | 6/2004 | Wehrung | ............... | G06Q 10/02 705/30 |
| 2006/0030968 A1* | 2/2006 | Ko | ........................ | G05B 19/414 700/213 |
| 2006/0272929 A1* | 12/2006 | Taylor | ................... | B65G 47/261 198/781.06 |
| 2007/0273307 A1* | 11/2007 | Westrick | ............ | H05B 37/0218 315/312 |
| 2012/0175223 A1* | 7/2012 | Breen | .................... | B65G 43/10 198/459.8 |
| 2012/0175225 A1* | 7/2012 | Breen | .................... | B65G 43/10 198/571 |
| 2012/0290126 A1* | 11/2012 | Combs | ................... | B65G 43/10 700/230 |

(Continued)

*Primary Examiner* — Mahran Y Abu Roumi
(74) *Attorney, Agent, or Firm* — Warner Norcross + Judd LLP

(57) ABSTRACT

A zone controller system that includes global communication of inputs, outputs and controller states from all zone controllers allowing each zone controller to operate based on inputs, outputs and controller states from all other zones. The zone controller system may also include direct one-to-one communication connections that allow additional communications. The system may include a user interface to configure operation of the zone controllers utilizing programmable logic equations that may use as variables the inputs, outputs and controller states of any zone controller. The user interface may be implemented in an off board configuration tool that is run on a computer connected to the global network. The system may also utilize one-to-one communications connections to provide self-repair and auto-configuration features. Each zone controller may store its ID(s) and configuration parameters on two other zone controllers, where they can be recovered for self-repair and auto-configuration.

7 Claims, 11 Drawing Sheets

(56) References Cited

U.S. PATENT DOCUMENTS

| | | | | |
|---|---|---|---|---|
| 2013/0058356 A1* | 3/2013 | Koponen | ............ | H04L 12/4633 370/412 |
| 2014/0129026 A1* | 5/2014 | Scholler | ................ | B65G 47/52 700/230 |
| 2014/0277698 A1* | 9/2014 | Combs | ................... | B65G 43/10 700/230 |
| 2014/0343720 A1* | 11/2014 | Danelski | ................ | B65G 43/08 700/225 |
| 2015/0068871 A1* | 3/2015 | Tachibana | .............. | B65G 43/00 198/502.1 |
| 2015/0144536 A1* | 5/2015 | Dugat | ...................... | B07C 5/36 209/2 |

* cited by examiner

900

| Zone Status Code | Description | Solo Status | PLC50 Status |
|---|---|---|---|
| ZONE_FULL | Indicates that the package is in the zone and has tripped the photo eye | Inactive | Blocked |
| ZONE_EMPTY | Indicates that the zone does not have a package. | Active | Unblocked |
| ZONE_LOADING | Indicates that the zone is trying to load the next package. | Active | Unblocked |
| ZONE_DISCHARGE | The package is moving out of the zone based on the status of the downstream zone. | Active | Blocked |
| ZONE_JAMMED | Special status for slug mode. State when a package is jammed. | Inactive | Blocked |
| ZONE_SLEEPING | Special status for Zone Sleep option. State when zone is empty and no package is coming after a certain amount of time. | Inactive | Unblocked |
| ZONE_STOPPED | State of all zones after an Emergency Stop signal is received. | Inactive | NA |
| ZONE_KILLED | State of an individual zone when its zone kill input is activated. | Inactive | NA |

Figure 9

ZONE CONTROL SYSTEM FOR CONVEYOR SYSTEM

BACKGROUND OF THE INVENTION

The present invention relates to conveyor systems and more particularly to zone control systems for conveyor systems.

Conveyor systems move desired payloads from one place to another in an orderly fashion. Rollers or belts are used to move the payloads. An example of a payload may be a cardboard box, a shipping container, a wooden pallet, or an automotive steel component. Within a conveyor system, there are often points, often called stations, along its length with varied equipment used to do work on the payload as it moves to its end destination. At each station an action or function is performed on the payload. Depending on the function to be performed, the conveyor may stop, a payload may be removed, or the conveyor may continue to move the payload. In addition to these stations, there are often merges, diverges, and intersections with other conveyors systems that moves the payload to and from those conveyor systems. A large number of inputs and outputs are used to do the handshaking between systems.

Although some conveyor systems simply move the payload from point A to point B, there is often a need to control the movement of payloads along its length. There are entrance and exit points of the conveyor that requires input and control signaling to stop and start the flow of the conveyor. These controls are required for interfacing with the various stations along its path. A frequently used type of control is called Zero Pressure Accumulation or (ZPA) which is a common industry term used to describe the separation of payloads as they are moved down the conveyor. ZPA controls the movement of the payloads, placing appropriate space between the payloads. ZPA avoids having a stack up of payloads queuing at the end of a conveyor where the pressure builds on the end payload, possibly causing damage.

To achieve the control necessary for the above action on a conveyor, the conveyor is divided 'n' number of fixed length sections or zones. A zone is of fixed physical length. The mechanism to control a zone varies widely. It can be a set of rollers interconnected that moves the payload through the zone. It could be one belt driven on top of a set of rollers moving the payload. Or a set of 2 or 3 chains linked together to move the payload. A zone can be driven using electric motors, hydraulics, pneumatics, or other types of methods. The common feature of all these drive mechanisms is that a command is given to activate or deactivate the zone.

Each zone is responsible for moving the payload into its zone, holding the payload, and discharging it to the next zone. An electronic device called a zone controller is usually used to control the action that occurs within the zone. Since a conveyor is divided into 'n' numbers of zones, there will also be 'n' number of zone controllers. Excluding the entry and exit zone, each zone interfaces to its adjacent neighbors to help determine its control. There are various methods of control and communications used to control the movement of the payload down the conveyor from entry to exit zones.

In one example, hardware inputs and outputs are used for signaling between adjacent controllers. This greatly restricts the data that can be communicated. It also requires individual wiring between controllers that is expensive and time consuming to assemble.

Another example uses serial communication between adjacent controllers. This gives the ability to communicate more detailed data between adjacent controllers, but the data the two controllers communicate is not shared outside of themselves.

In another example, serial communication is used between controllers as above, and the data is daisy-chained (or passed) through to the next adjacent controller, and the next adjacent controller, etc. This methodology provides the means for a zone controller to send and receive data with other zone controllers in the system. But as the number of conveyor zones increase, the number of data messages to pass through a zone controller increases dramatically, and consumes zone controller resources. The data messages are kept very short and the amount of data limited. Lag times become an issue because of the daisy-chain effect. Real-time data messaging cannot be achieved.

As a payload moves down a conveyor, secondary processing of the payload may occur. For example a payload may be wrapped, stacked, sealed, etc. Auxiliary inputs and outputs on the zone controller are used to interface to the device for this processing. This is outside of the normal zone control and the signaling between zone controllers. Special functions are often provided in the zone controller to handle the interface. Often customized functions must be developed.

Some of the existing zone controllers provide auxiliary inputs and outputs. An input triggers the execution of a specific function in the zone controller. The output is also controlled by a function executing on the zone controller. A limited set of functions are available, and are selected through switch settings or connector wiring on the zone controller. The inputs and outputs only affect the zone controller they are connected to, and cannot be used by other zone controllers in the system. Additional wiring is required if used by more than one zone controller.

One example allows for a central point to connect a maximum of eight inputs or outputs to a conveyor. An input can only be assigned to one zone controller. Each output can only be assigned to a single output of one zone controller. As above, an input triggers a specialized function to execute in the zone controller. Likewise, an output is controlled by a function executing in the zone controller. This example requires that a separate enclosure with electronics and connection points be mounted somewhere on the conveyor. This often becomes a logistics problem when it is necessary to interface to multiple devices along the conveyor.

Zone controllers typically offer a set of options or parameters to the user so that the conveyor action can be 'tuned' for the particular type of payload it is moving. Some examples are timers, modes, speeds, etc. Many zone controllers on the market use switches and wire jumpers to set these options. More recent zone controllers set these parameters in the controller memory using remote programming tools. Saving the parameters in memory allows for a wider range of options and much more complexity with them. The parameters are stored in non-volatile memory that retains its value when power is removed. The conveyor is put into use and may work flawlessly for a long time. But, issues may arise when a zone controller fails and must be replaced.

When the options are set using switches or wire jumpers, the replacement zone controller is setup like the one it replaced and installed. When the options are in memory and the zone controller fails, it becomes harder. In may have been months or years since the zone controller was first configured and trying to find what the options were can be problematic. It can be difficult to determine if the options were documented for each zone controller in the system. Even if the options where properly documented, the documentation may be difficult to locate—particularly after a long period of time. Experience has revealed that this problem is very common.

After replacing a failed zone controller, some systems requires that the options be manually setup with the configuration tool. Other systems can load an archived file of the configuration (assuming one was saved) from a PC and use it to configure the replacement zone controller. But these methods are time consuming and problematic, and keep the conveyor offline for an extended period.

It should also be noted that no known ZPA controller systems have the ability to be reprogrammed or updated with new features or customize programs. Instead, they must be removed and replaced with newer models. Further, no known ZPA controller systems have the ability to connect with an external network for monitoring or updating.

SUMMARY OF THE INVENTION

The present invention provides a zone controller system that includes global communication of certain inputs, outputs and controller states from all zone controllers to allow individual zone controllers to make intelligent decisions based on inputs, outputs and controller states from other zones, including zones that are not immediately adjacent. The zone controller may also include local communications that allow zone controllers to share select communications with adjacent zone controllers. Local communications may include direct one-to-one communication channels (e.g. peer-to-peer communications) that are used to communicate essentially any desired data, such as inputs, outputs and controller states, between adjacent controllers.

In one embodiment, the zone controller system includes a plurality of zone controllers connected together via a network permitting global communications accessible by all zone controllers. The global network may be a conventional network (wired or wireless) utilizing conventional communications protocols, or it may be a proprietary network and/or a proprietary communications protocol. In one embodiment, each zone controller may also be connected to one or more of the other zone controllers via one-to-one communications, such as a direct wired connection. In one embodiment, each zone controller is connected to the immediately upstream zone controller using one one-to-one communications channel and to the immediately downstream zone controller using a second one-to-one communications channel. Each one-to-one communications channel may be implemented using a direct-wired connection.

In one embodiment, each zone controller includes a set of user established parameters that configure the zone controller for operation in the corresponding zone. The zone controller system may include an off-board configuration tool that is used to configure each zone controller. The configuration tool may be software executed on a computer that is coupled to the global communications network.

In another aspect, the present invention provides a zone controller system in which operation of each zone controller is configured via a user interface that allows a user to define operation of the zone controller utilizing Boolean algebra. In one embodiment, the Boolean algebra is implemented in the form of programmable logic equations that are programmed into individual zone controllers. The logic equations may use as variables any of the inputs, outputs and controller states obtained from within that zone or via local or global communications.

In one embodiment, each zone controller includes a plurality of outputs that can be used to control elements of the conveyor system. Each output can be operated by the controller in response to a corresponding programmable logic equation associated with that output.

In another aspect, the present invention provides a zone controller system in which the zone controllers are provided with self-repair functionality. In one embodiment, the configuration parameters of each zone controller are stored in memory in at least one other zone controllers. In some embodiments, the configuration parameters are stored in at least two other zone controllers to provide a layer of redundancy. For example, the configuration parameters of each zone controller can be stored in memory on the immediately upstream and immediately downstream zone controllers. When the need for reconfiguration occurs, the zone controller may recover and compare its configuration parameters from the two zone controllers. If the recovered parameters match, the zone controller can configure itself using the recovered parameters. If not, an error condition can be reported.

In one embodiment, each zone controller runs self-check diagnostics at every power-up. The zone controller may check to determine if data (e.g. configuration parameters) is corrupted. If data corruption is noted, the zone controller may attempt to repair its configuration parameters using the self-repair functionality. More specifically, the zone controller may obtain copies of its configuration parameters from the other zone controllers on which they are stored. If the configuration parameters recovered from the other zone controllers match, the zone controller can reconfigured itself with those configuration parameters.

It one embodiment, each zone controller may during self-check diagnostics confirm its Controller ID and UUID with its two adjacent neighbors. If there is an ID mismatch, the zone controller will assume it is a new un-configured zone controller and will automatically configure itself using configuration parameters stored in the adjacent controllers and update its Controller ID and UUID with the adjacent neighbors.

In one embodiment, local communications are used to implement the self-repair and automatic configuration functionalities. In this embodiment, each zone controller may include an upstream communications port for directly communicating with the upstream zone controller on a one-to-one basis and a downstream communications port for directly communicating with the downstream zone controller on a one-to-one basis. The use of direct local communications ensures that each zone controller is communicating with the correct upstream and downstream zone controllers without the need to know the identification of those zone controllers, thereby avoiding the need to pre-configure or pre-program a zone controller to enable local communications.

The present invention provides a simple and effective zone controller system for a conveyor system. The use of global communications between zone controllers allows each zone controller to make intelligent decisions informed by information available from all other zone controllers on the global network. The use of direct one-to-one communications allows a zone controller to implement self-repair functionality without the need for any related pre-configuration. Similarly, the use of direct one-to-one communications allows a new replacement zone controller to be automatically recognized and configured by other zone controllers without the need for any related pre-configuration. The use of programmable logic equations to define operation of each zone controller not only simplifies configuration, but also provide a simple and effective way of making zone controller actions dependent on a wide range of variables that might be obtain from other zone controllers on the global network. Further, the self-repair functionality dramatically simplifies the process of repairing and/or replacing zone controllers. The use of automatic self-diagnostic can allow repair and/or replacement to occur without any user intervention. By storing the configuration parameters on a plurality of different zone controllers, the system provides a layer of redundancy that may help to ensure proper repair and/or replacement of a zone controller.

These and other objects, advantages, and features of the invention will be more fully understood and appreciated by reference to the description of the current embodiment and the drawings.

Before the embodiments of the invention are explained in detail, it is to be understood that the invention is not limited to the details of operation or to the details of construction and the arrangement of the components set forth in the following description or illustrated in the drawings. The invention may be implemented in various other embodiments and of being practiced or being carried out in alternative ways not expressly disclosed herein. Also, it is to be understood that the phraseology and terminology used herein are for the purpose of description and should not be regarded as limiting. The use of "including" and "comprising" and variations thereof is meant to encompass the items listed thereafter and equivalents thereof as well as additional items and equivalents thereof. Further, enumeration may be used in the description of various embodiments. Unless otherwise expressly stated, the use of enumeration should not be construed as limiting the invention to any specific order or number of components. Nor should the use of enumeration be construed as excluding from the scope of the invention any additional steps or components that might be combined with or into the enumerated steps or components. Any reference to claim elements as "at least one of X, Y and Z" is meant to include any one of X, Y or Z individually, and any combination of X, Y and Z, for example, X, Y, Z; X, Y; X, Z; and Y, Z.

BRIEF DESCRIPTION OF THE DRAWINGS

FIG. 9 is a table that describes the states of a zone controller.

DESCRIPTION OF THE CURRENT EMBODIMENT

Overview

Figure 1:
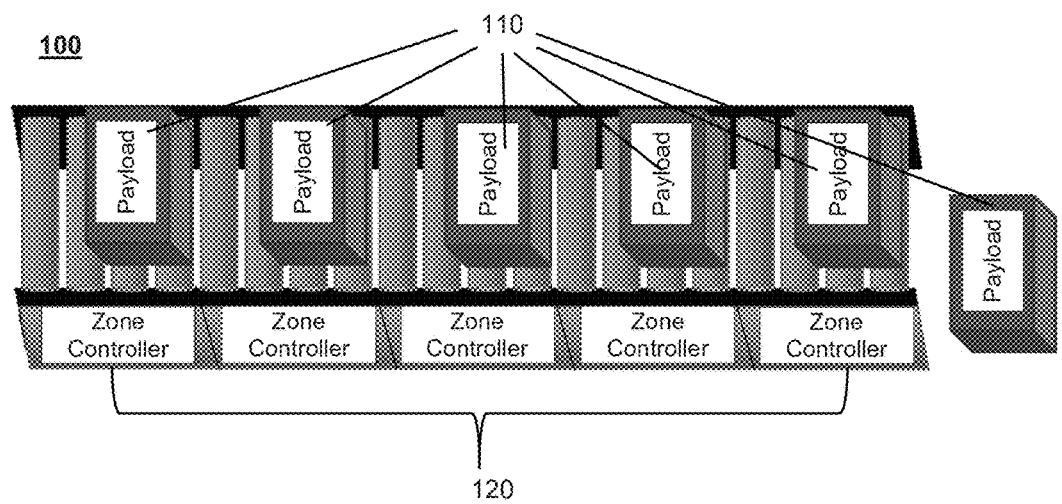
FIG. 1 is a drawing of a basic conveyor using ZPA.

A conveyor system 100 having a zone controller system 10 in accordance with an embodiment of the present invention is shown in FIG. 1. The zone controller system 10 includes a plurality of zone controllers 120 that are interconnect by a global communication network 330 and a local communication network 340. The global communication network 330 allows each zone controller 120 to share data with every other zone controller 120, while the local communication network 340 allows each zone controller 120 to share select data with adjacent zone controllers 120. Each zone controller may globally communicate the state of its inputs, the state of its outputs and its controller state. Each zone controller may locally communicate the status of the payload in the zone to the adjacent controllers. In this embodiment, essentially any information obtained through global communications or local communication can be utilized in dictating operation of a zone controller. The zone controller system may include a configuration tool having a user interface that allows each zone controller to be programmed using Boolean logic equations. The logic equations may use as variables any of the inputs, outputs and controller states obtained from within that zone or from any other zone via local or global communications. The zone controller system may include local communications that connect each zone controller with at least two other zone controllers, such as the immediately upstream zone controller and the immediately downstream zone controller. In this embodiment, the local communications are implemented using direct one-to-one communications channels, such as direct wired connections. Each zone controller is configured to store its configuration parameters on the adjacent controllers using the local communications channels. This allows an existing zone controller to perform self-repair and a new zone controller to perform automatic configuration.

Zone Controller System

In the various embodiments shown in the drawings, the zone controller system 10 includes a set of individual zone controllers 120 that work together to process payloads through the conveyor system 100.

For purposes of disclosure, the present invention is described in connection with a relatively simple conveyor system having a single linear conveyor line with five zones. FIG. 1 shows a typical single linear conveyor broken into 5 zones to achieve Zero Pressure Accumulation (ZPA). The conveyor system 100 has five zone controllers 120, one for each zone. A payload 110 is shown in each zone as well as one that just exited the conveyor. Despite the relatively simplicity of the conveyor system of FIG. 1, the zone controller system of the present invention may be incorporated into conveyor systems of almost any level of complexity. For example, the zone controller system 10 may be incorporated into a conveyor system having almost any number of conveyor zones that include almost any number of merging or splitting conveyor lines. Further, the disclosed conveyor system 100 is a zero pressure accumulation (ZPA) system, but the invention may be readily implemented in other types of systems.

Figure 2:
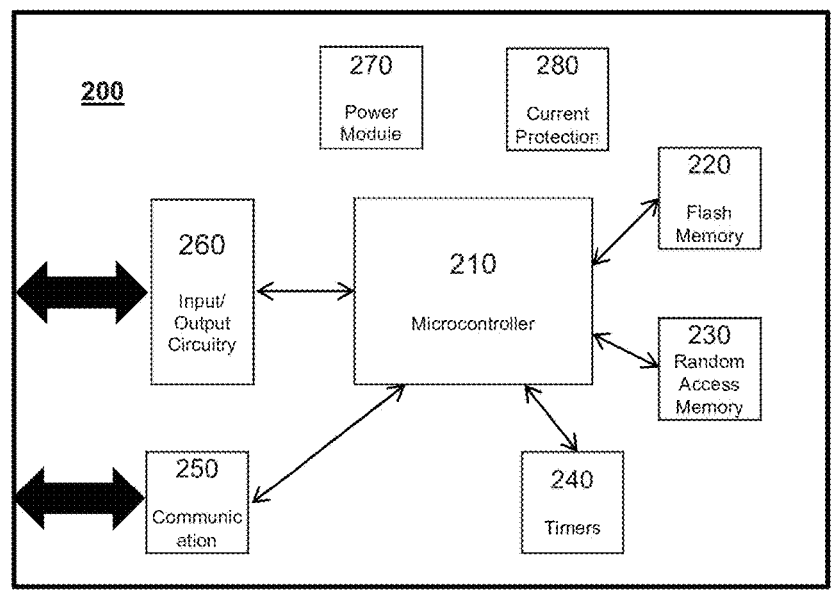
FIG. 2 shows the common electronic functional blocks of the zone controller.

FIG. 2 is a block diagram showing the common electronic functional blocks of one embodiment of a zone controller. In the embodiment shown in FIG. 2, the zone controller 200 is an electronic system that contains a microcontroller 210 executing a unique software program (often called firmware) that enables it to control the conveyor zone to which it is assigned. The zone controller 200 of this embodiment includes, but is not limited to, flash memory 220 (or other form of persistent memory), random access memory 230, input circuitry 260, output circuitry 260, communication electronics 250 and power conditioning circuitry 270, 280. In this embodiment, the sum of the components makes up the zone controller 200. The design and configuration of the zone controller 200 may, however, vary from application to application. For example, the physical architecture of the zone controller may vary with different functionality being distributed across a plurality of different physical components.

In the illustrated embodiment, each zone within a conveyor system will have a zone controller assigned to it, and it is the interoperability of these zone controllers that controls the movement of payloads along the conveyor.

The zone controller system 10 includes communications capabilities that allow zone controllers 120 to communicate with one another. The present invention may be implemented using a variety of different communications schemes. In the illustrated embodiment, the zone controller system 10 includes both local and global communications networks. However, zone controller systems in accordance with the present invention may be implemented differently. For example, an alternative embodiment implemented using only a global communications network is described below.

Figure 3:
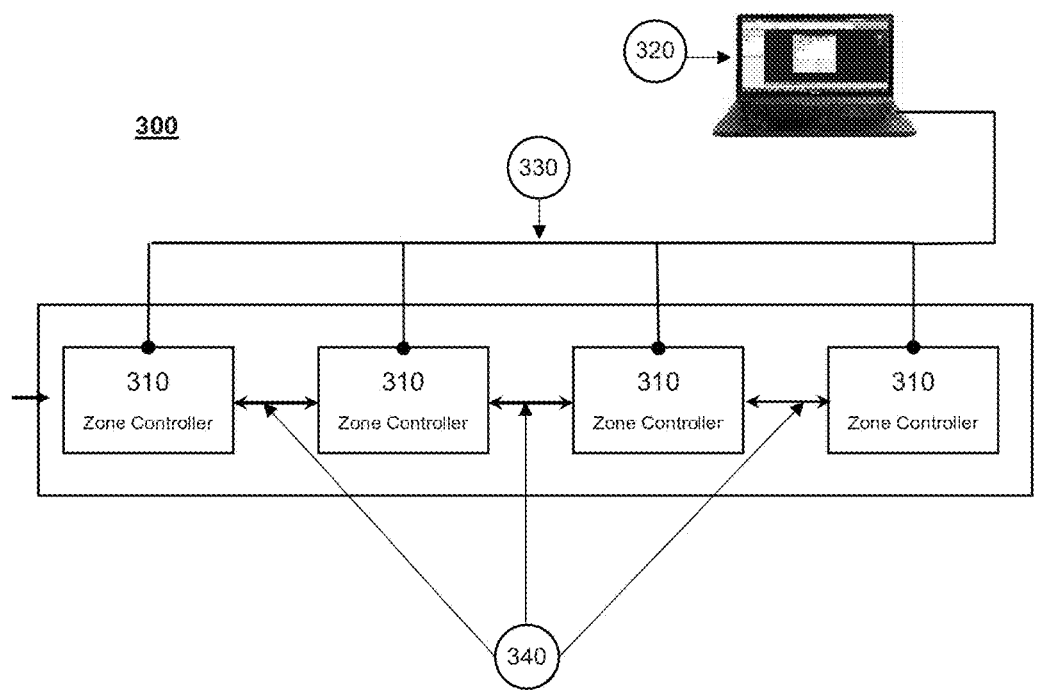
FIG. 3 shows the local and global bus networks as well as the off board programming tool and connection.

FIG. 3 is a representational diagram of a conveyor system 300 in accordance with an embodiment of the present invention. In the embodiment of FIG. 3, the conveyor system 300 includes a conveyor divided into a plurality of zones with each zone including a zone controller 310. In this embodiment, each zone controller 310 has multiple communication channels, including a global communication network 330 and direct one-to-one communication connections with adjacent zone controllers. As shown, a local communication bus network 340 is used between zone controllers adjacent to each other. For example, zone controller "n" communicates to zone controllers "n−1" and "n+1". This bus is used to communicate the status of the payload in the zone to the adjacent controllers. The data is considered localized. The local communication bus network 340 of the illustrated embodiment uses a standardize communication protocol including, but not limited to CAN, LIN, Ethernet. Alternatively, the local communication bus network may utilize a proprietary communication protocol.

In the embodiment of FIG. 3, a global bus network 330 separate from the local bus network 340 is used for system wide communications. This bus network 330 is used by all zone controllers to broadcast their zone states, the states of their inputs, and the states of their outputs, and can be received by any zone controller 310 in the system. In this embodiment, the zone controllers may work as a distributed intelligence system through this bus network. The global network bus 330 of the illustrated embodiment uses standardize communication protocols including, but not limited to, CAN, LIN, Ethernet, WI-FI, and Bluetooth. Alternatively, the global network bus may utilize a proprietary communication protocol.

Each zone controller has a set of parameters that configure a conveyor for the type of payload it is moving. These configuration parameters can differ between zone controllers. Options may include delay timers, counters, handling modes, special functions, input and output setups. For example, it might be required to delay the exit of a payload from a zone because of the type of secondary process occurring in the next zone. Another example is that 3 payloads need to be released at exit, so a counter waits until 3 are available in the queue. In the illustrated embodiment, the system includes a configuration tool for programming the zone controllers with appropriate configuration parameters. In the embodiment of FIG. 3, the system includes an Off Board configuration tool 320 to configure each zone controller. The Off Board configuration tool of this embodiment is a program executing on a PC that is connected to the global bus network 330. The configuration of parameters in the zone controllers give the controller system 300 the specialized functionality needed to execute. Once the controller system 300 is completely configured, the Off Board configuration tool may be disconnected from the system and the system may operates independently.

The electrical components of the zone controller 120 of the illustrated embodiment will now be described in more detail with reference to FIGS. 2 and 4. As noted above, and shown generally in FIG. 2, the zone controller 120 of the illustrated embodiment generally includes a microcontroller 210, Flash Memory 220, Random Access Memory 230, Timers 240, Inputs 260, Outputs 270, Communication Interfaces 250, and Power Conditioning 270, 280. The zone controller 120 contains a Central Processing Unit (CPU) that executes the firmware 500 and runs the dedicated program. Although the illustrated embodiment includes flash memory 220 and RAM 230, the zone controller may be implemented with other types of memory, including other types of volatile and non-volatile computer storage.

As shown, the zone controller 120 includes a plurality of external components connected to the microcontroller 210 to enable the microcontroller 210 to interface to the outside world. These components may include, but are not limited to, power isolation and protection circuitry, communication interface components, input receivers, output receivers, bus network drivers and a plurality of input and output connectors. Although the zone controller components may vary from application to application, FIG. 4 is a block diagram showing representations of the connectors that may be employed in one embodiment of a zone controller 120. As shown, the zone controller 120 of FIG. 4 may include a pair of power inputs 430, an output 440 for controlling an external device, an input connector 450 for receiving input from an external device, an auxiliary output 460, an auxiliary input 470, communication ports 420 and indicator LEDs 410. The zone controller 120 may also include jumpers 480 that can be used to set the hardware configuration.

Although this example shows a single input 450 configured to receive input from a photo eye, the zone controller 120 may have multiple hardware inputs connected to a variety of input devices, including, but not limited to, photo eyes, proximity detectors, input switches, foot petals and signaling outputs from other zone controllers. The inputs may be analog or digital depending on the component to be connected. The number and type of inputs may vary from application to application.

Figure 4:
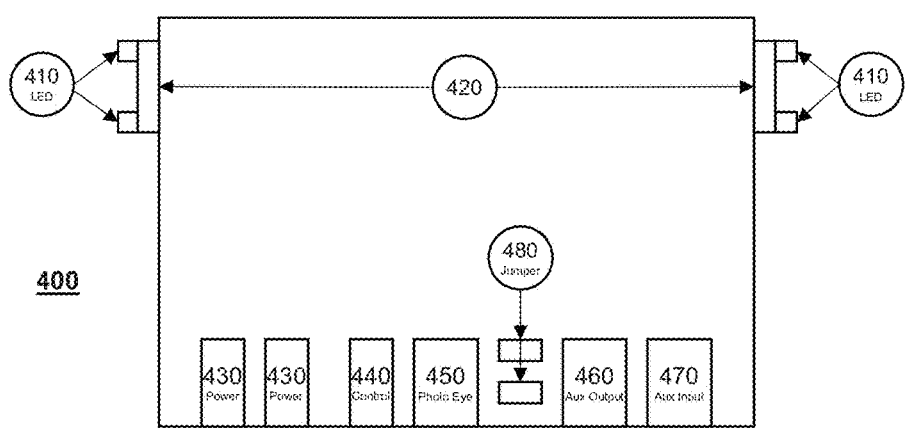
FIG. 4 shows the input, output, and communication connectors on the zone controller.

Further, the embodiment of FIG. 4 shows a single output configured to send a control signal to external device, but the zone controller 120 may have multiple output ports capable of controlling a variety of devices, including, but not limited to, DC motors, pneumatic solenoids, solid state relays, and AC motors. As with the inputs, these output ports may vary from application to application. For example, the output ports may include analog and/or digital outputs.

The device of the illustrated embodiment also includes multiple communications ports 410 available for localized and global bus networks. For example, in the illustrated embodiment, the zone controller includes an upstream bidirectional communication port 420a for communicating with the immediately upstream zone controller, a downstream bidirectional communication port 420b for communicating with the immediately downstream zone controller and a global bidirectional communication port (not shown) for communicating over the global network.

In the illustrated embodiment, the zone controller system may be implemented using CAN bus networks for both local and global communications. To implement CAN bus functionality, each zone controller may include a CAN controller and a CAN transceiver for each communication network. The CAN controller(s) may be an integral part of the microcontroller.

Figure 5:
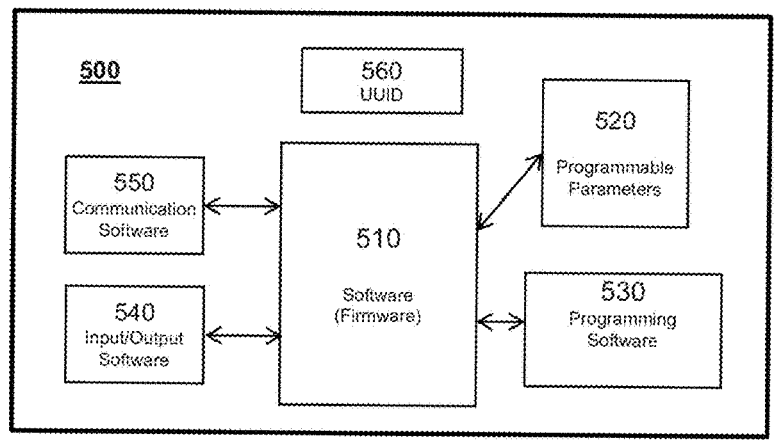
FIG. 5 shows the functional blocks of the zone controller's software.

FIG. 5 is a block diagram representing various functional aspects of a zone controller. As noted above, the zone controller 500 of the illustrated embodiment has a set of programmable options or parameters 520 that configures the zone controller for its particular control and interface. In this embodiment, an Off Board configuration tool is used to configure each zone controller. In the illustrated embodiment, the Off Board configuration tool is a software application running on a computer connected to the global network. A user can enter the set of programmable options or parameters for each zone controller using the Off Board configuration tool, and the Off Board configuration tool can communicate them to the zone controller using the global network. As an alternative, each zone controller may include an on-board configuration tool.

In the illustrated embodiment, each zone controller is given a unique zone controller identifier, referred to as a Controller ID, during system configuration. This identifier uniquely identifies each zone controller within the system and is used for all communications on the global bus network. In some applications, the zone controller system may be implemented using controllers that are provided with universal unique identification numbers at manufacture (e.g. UUID). If desired, the zone controller system may use the UUID in addition to or as an alternative to the Controller ID for purposes of uniquely identifying each zone controller within the system.

During operation, each zone controller is capable of being in one of a plurality of "zone state." In the illustrated embodiment, the firmware for a zone controller is always in a particular zone state, and changes zone states base on various inputs. The zone state of a zone controller may vary depending on essentially any input of that zone controller or any input, output or zone state of a different zone controller, but will often be dependent in part on the presence or absence of a payload in its zone. Examples of zone states are Loading, Discharging, Empty, Full, and Stopped. These states are merely exemplary and a zone controller system may be implemented with essentially any additional or alternative states. Changing zone states is usually the result of input from detection sensors like photo eyes and proximity detectors, but it may be triggered by other factors. Other factors may include, but are not limited to, the inputs, outputs or states of other zone controllers.

In the illustrated embodiment, each zone controller also monitors the zone states of the adjacent zone controllers over the local communication bus network 340. Beside hardware inputs, it often required to know the zone state of adjacent controllers. For example if a zone controller state is Full, the firmware monitors the adjacent controller to see if its zone state is Empty. It then changes zone state to Discharging that activates the movement of the payload out of the zone.

Figure 6:
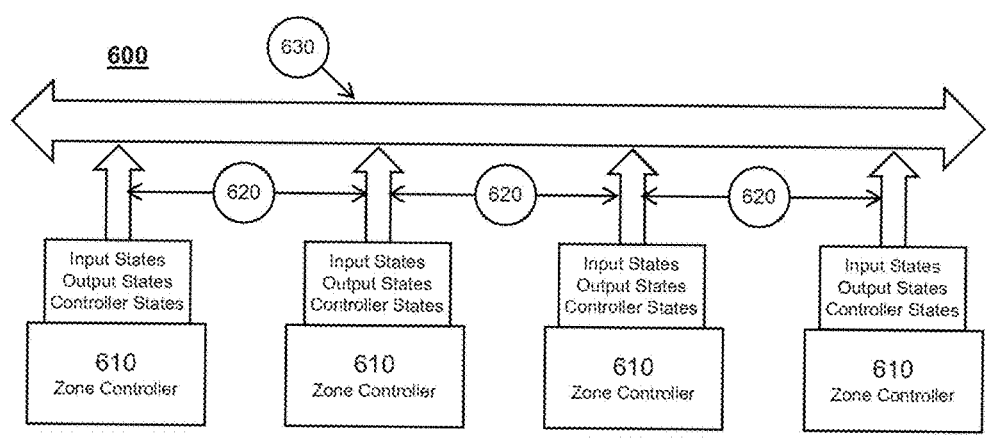
FIG. 6 shows the periodic data that is broadcast by the zone controllers on to the global bus network.

In the illustrated embodiment, each zone controller communicates the state of its inputs, the state of its outputs and the overall zone state. The zone controllers of the illustrated embodiment communicate these states over both local communications and global communications. For example, as shown in FIG. 6, the zone controller system 600 may include a plurality of zone controllers 610 that each transmits its input states, output states and controller states over a direct one-to-one communication connection 620 and over the global communication network 630. The timing of these transmissions may vary from application to application. In some applications, the transmission may occur on a periodic basis. In other applications, they may occur on an event driven basis. Local communication transmits at a periodic rate between 0.025 and 1.0 seconds under normal operating conditions. During controller initialization and self-repair the transmission rate is non-periodic. For example, with regard to global transmissions, at a periodic rate between 0.025 and 1.0 seconds the zone controller firmware transmits 620 the hardware input and output states, and the zone state of the zone controller 610 on to the global bus network 630. The rate may vary from application to application, and may be determined by the number of zone controllers used on the conveyor.

Each zone controller 610 on the global bus network can monitor global transmission to maintain a current status of the input and output states, and zone states of all other zone controller on the global bus network 630.

The firmware may also contain special programming software 530 that allows the main firmware program to be upgraded to newer versions, or loaded with special customer functionality. In the illustrated embodiment, the zone controller's firmware can be reprogrammed by the same Off Board configuration tool 320 using the global bus network 330.

As can be seen, the zone controller system of the illustrated embodiment is a distributed intelligence system. No master unit is required to coordinate the movement of payload through the conveyor. Setting parameters in the individual zone controllers allows it to make a local decision for its zone based on data presented on the global bus network 330 and the local bus network 340.

Figure 7:
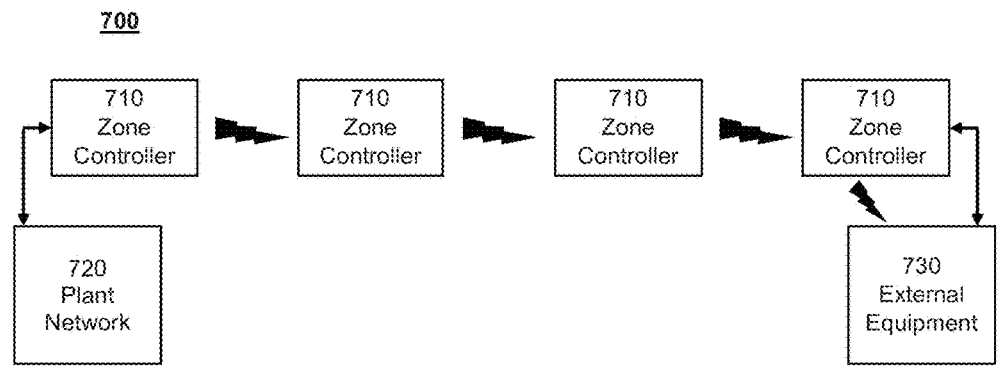
FIG. 7 replaces the interconnection between zone controllers with a wireless protocol. It also shows interconnections to a plant network and external equipment.

In the illustrated embodiment, the zone controller system is implemented using wired communications, such as CAN bus networks. Alternatively, wireless communications may be used for communication between zone controllers, thus eliminating the wired connections. For example, FIG. 7 is a representation of a zone controller system 700 having a plurality of zone controllers 710 that are connected via wireless communications. Wireless standards such as, but not limited to, Wi-Fi (802.11G) Bluetooth, and Zigbee can be used.

In some applications, a connection to a plant network can be used to allow for remote configuration and monitoring of the conveyor system. For example, FIG. 7 shows a zone controller system that is connected to the plant network 720. Wireless standards such as, but not limited to, Wi-Fi (802.11G) Bluetooth, and Zigbee can be used to connect the zone controller system 700 to the plant network. Also hardwired connections like Ethernet are possible.

Further, connections to other plant equipment can be implemented to allow external control and interfacing. For example, as shown in FIG. 7, the zone controller system 700 may be connected to a piece of external equipment 730 by wired or wireless connections. Wireless standards such as, but not limited to, Wi-Fi (802.11G) Bluetooth, and Zigbee can be used for this connection. Also hardwired connections like Ethernet, Decnet, and DeviceNet can be used.

Figure 8:
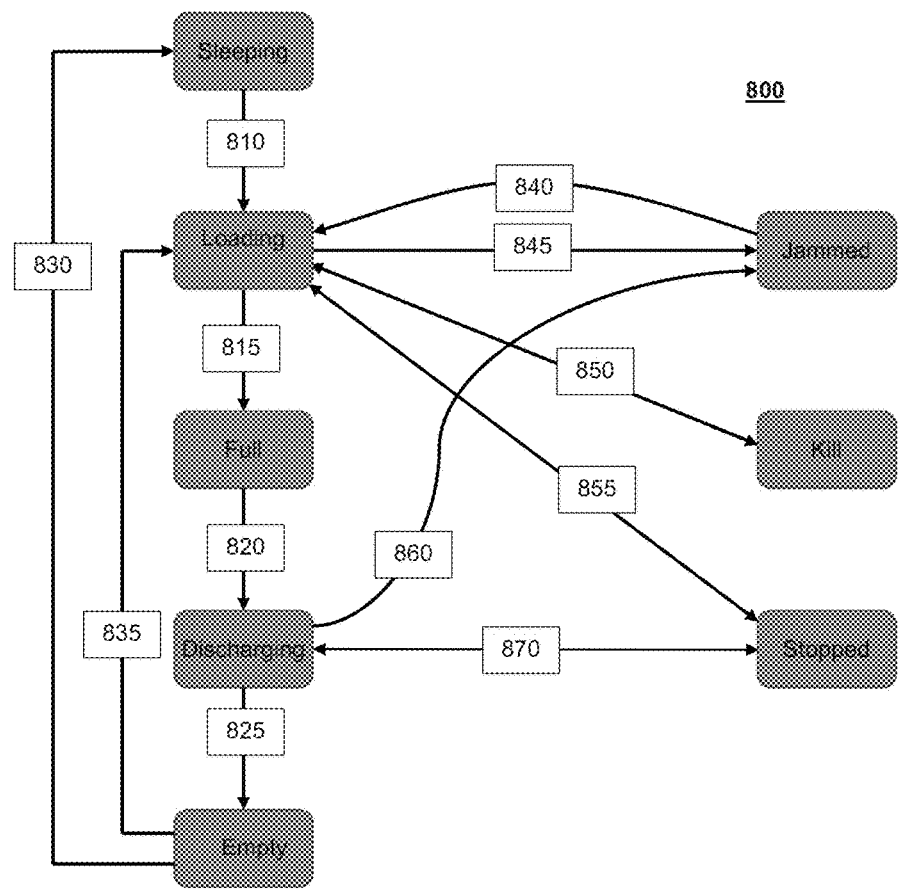
FIG. 8 is a state diagram showing the states of the zone controller and the movements between states that could occur.

In the illustrated embodiment, each zone controller is responsible for a specific physical zone of the conveyor system. A zone controller processes the payload through the zone, typically relying on a multiple of inputs to determine the actions to take on the payload. Depending on the action to take, the zone controller determines if the zone should activate, and if any other outputs should be signaled. This may include actuating external components, such as motors, divert arms, indicators, and external equipment interfaces. FIG. 8 is a state diagram showing the states of the zone controller and the potential movements between states. The zone controller software algorithm moves through a series of states 800 to move the payload through the zone. The movement from one state to the next 810-860 is controlled by setting options for various inputs and outputs to control the state of that zone controller. The state diagram 800 of FIG. 8 provides an example of the state machine as it operates within the controller of the illustrated embodiment. The movement from one state to another state is triggered by both internal and external stimuli. The following paragraphs describe the various zone states of the illustrated embodiment.

SLEEPING—the zone has no payload and the zone becomes inactive. An internal and/or external signal transitions 810 from this state to the LOADING state.

LOADING—the zone activates and begins to move a payload into the zone.

Once the payload is fully in the zone (usually a photo eye sensor), it transitions 815 to the FULL state.

FULL—the payload is fully in the zone and the zone is inactive. It transitions 820 to the Discharging state when an internal or external signal is received.

DISCHARGING—the zone activates and discharges the payload. It stays in this state until an internal and/or external signal indicates the payload has passed out of the zone. Once the payload is out of the zone, it transitions 825 to the EMPTY state.

EMPTY—a timer is associated with this state. The zone stays active for a configurable amount of time, and waits for an internal and/or external signal to indicate a new payload is available. Once the signal for a new payload occurs, it transitions 835 to the LOADING state. If no payload becomes available after the set time, the zone controller transitions 830 to the SLEEP state.

JAMMED—when the zone is active in the LOADING and DISCHARGING state, it is possible the payload may twist or move, and cause it to become stuck in the zone. A configured timer monitors the length of time a payload is moving in the zone. If the timer expires, the zone controller deactivates and transitions 845 and 860 to the JAMMED state. The payload may be manually fixed at this point. Once fixed, it transitions 840 to the LOADING state where it may cascade down to the DISCHARGING state.

KILL—this state is triggered by an internal and/or external signal monitored by the LOADING state to stop a particular zone and transitions 850 to the KILL state. While in the KILL state, no other state activity is allowed. Removal of the trigger signal transitions 850 it back to the LOADING state. This is usually used to clear the zone to place an extra payload onto the conveyor. It is also used to stop a zone so that a payload can be removed from an upstream zone.

STOPPED—this state is triggered by an internal and/or external signal monitored by the LOADING and DISCHARGING states and transitions 855 and 870 to the STOPPED state. While in the STOPPED state, no other state activity is allowed. Removal of the trigger signal transitions 855 and 870 it back to the LOADING or DISCHARGING states. The purpose is to stop all movement in the zone.

As noted above, the zone controller system 10 may include a plurality of different states. The selection and number of states may vary from application, but will typically be selected to include sufficient diversity of states to allow implementation of all desired operations within the zone controller system. For example, the zone controllers may have a separate state for each separate condition that might be relevant to function or operation of any zone controller. FIG. 9 is a table showing a list of zone controller states for one embodiment of the present invention. In this embodiment, the status of a zone controller may be, in part, dependent on the status of the conveyor rollers and the status of a photo eye. In other embodiments, the status of the zone controller may be dependent on other factors, such as the inputs, outputs or zone controller status of any zone controller in the system. This list is exemplary and may include additional or alternative zone controller states. The input states, output states, and controller zone states 900 of each controller are broadcast on the global bus network 630 at a high periodic rate. The period of the data broadcast helps to ensure the currency of the data, especially in relationship to other controllers in the system. The identity of the zone controller broadcasting the states is part of the data so that the correct zone information is used for decision making. For example, a controller ID or other form of unique identification may be incorporated into each data transmission so that the receiving zone controller can associated the data with the proper zone controller.

Since the hardware input and output, and controller zone states of each controller are broadcast on the global bus network 630, a zone controller can use that knowledge to determine the action it takes in its zone. With this system, each zone controller has greater flexibility and more powerful decision making capabilities.

Figure 10:
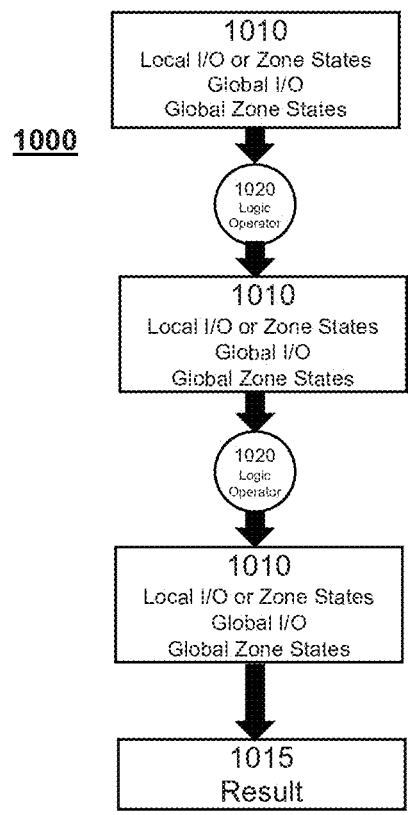
FIG. 10 shows how global inputs, outputs, and controller states can be used in logical equations for decision making.

Generally speaking, one basic purpose of all zone controllers is to determine how a payload is handled in the corresponding zone. For example, should a payload be discharged from the current zone to the next zone, should the payload be held, or should the conveyor zone be activated to allow a payload to move into the zone? With the global bus network design of the illustrated embodiment, a zone controller can determine an action to take based on any zone controller input, output, and controller states within the system. The data is limited only by the size of the system. To facilitate configuration of the zone controllers, the system may facilitate programming of the zone controllers using programmable logic equations. For example, the system may be programmable using programmable logic equations that can use the inputs, outputs and controller states of the various zone controllers as variables that drive operating decisions. As example of a programmable logic equation is shown in FIG. 10. As shown, the programmable logic equation 1000 may include a plurality of variables 1010 that are interrelated using logic operators 1020 to define the conditions that generate the result 1015. The use of Boolean algebra allows for greater control and flexibility for decision making in the zone controller. Boolean logical operators 'AND', 'OR', and 'NOT' 1020 are used with both the local states of the zone controller as well as the global I/O of the system to calculate the action of a zone controller, or to change the state of an output. In the illustrated embodiment, the logic equations 1000 are programmed and downloaded to a particular zone controller at system configuration. When running the conveyor in production, these logic equations 1000 help determine the payload flow on the conveyor system. A typical logic equation might be:

If zone controller 5 state is EMPTY AND Zone controller 8 state is DISCHARGING AND the input to zone controller 4 (a floor switch) is ON THEN turn On the auxiliary output of this zone.

The logic equations may vary in complexity from application to application. As should be evident, the length and depth of a logic equation can be quite large because every zone controller's inputs, outputs, and controller states in the system are available to use. The order of operations (sometimes called order of precedence) rules are used to determine which logical operator is worked on first. The result of any logic equation is TRUE or FALSE.

Figure 13:
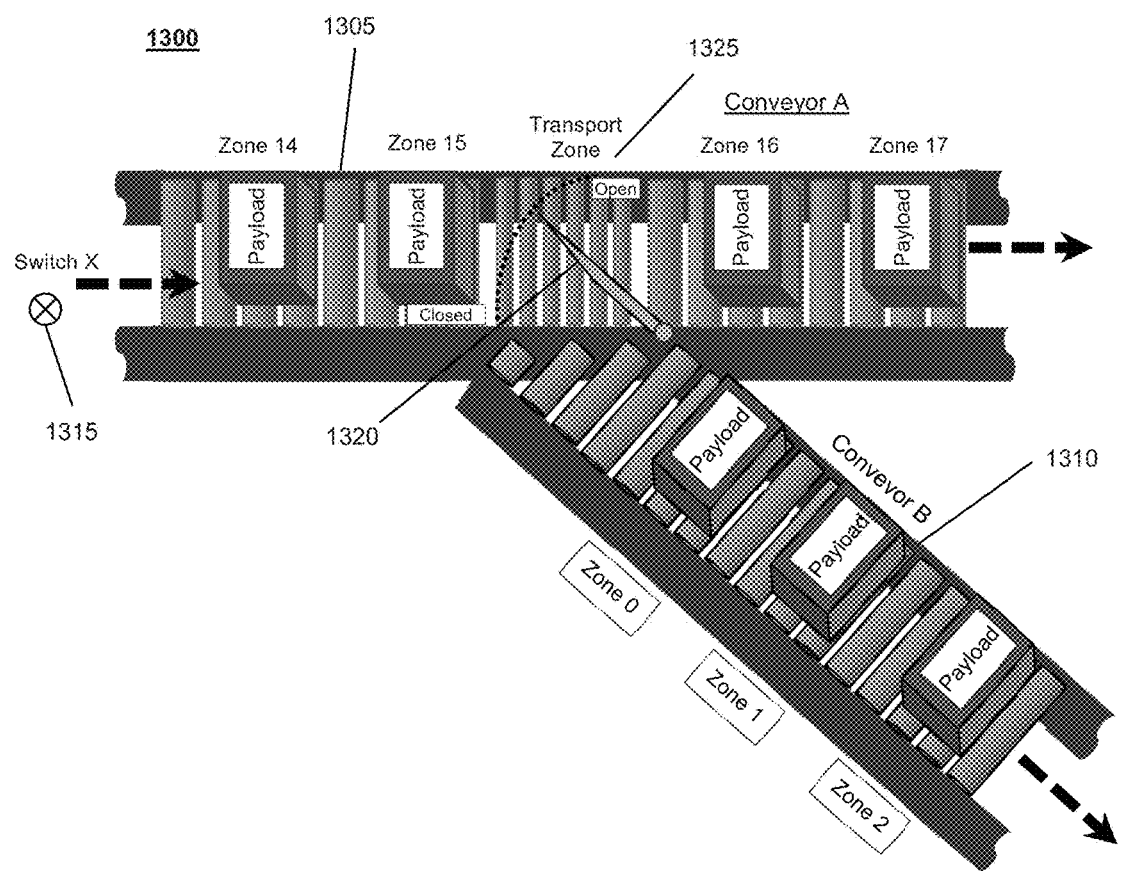
FIG. 13 is an illustration of a first alternative conveyor system.

A specific example is shown in FIG. 13. Conveyor A 1305 is the main conveyor to move a payload to the next processing station. Conveyor B 1310 is a divergent conveyor that is connected to Conveyor A. If Conveyor A starts to backup because of a processes or faults downstream, it is sometimes desired for the payloads to diverge to Conveyor B. Switch X 1315 upstream from this section determines if the payloads should divert to Conveyor B when backups occur or just continue to back up on Conveyor A. A diverter arm 1320 is use to select if the payload should continue down Conveyor A or divert to Conveyor B. The transport zone 1325 is a type of zone that runs continuously to move the payload in the diverge.

Following the logic description above, there will be two logic equations executed to perform this function.

IF Zone 16 controller state is FULL AND Zone 15 controller state is FULL AND Switch X is Enabled THEN signal the divert arm to the open position.

A second equation executes concurrently.

IF the diverter arm 1320 is in the open position AND Zone 15 controller State is TRUE THEN Zone 15 releases payload from Zone 15 and moves to Zone 0 on Conveyor B.

Figure 14:
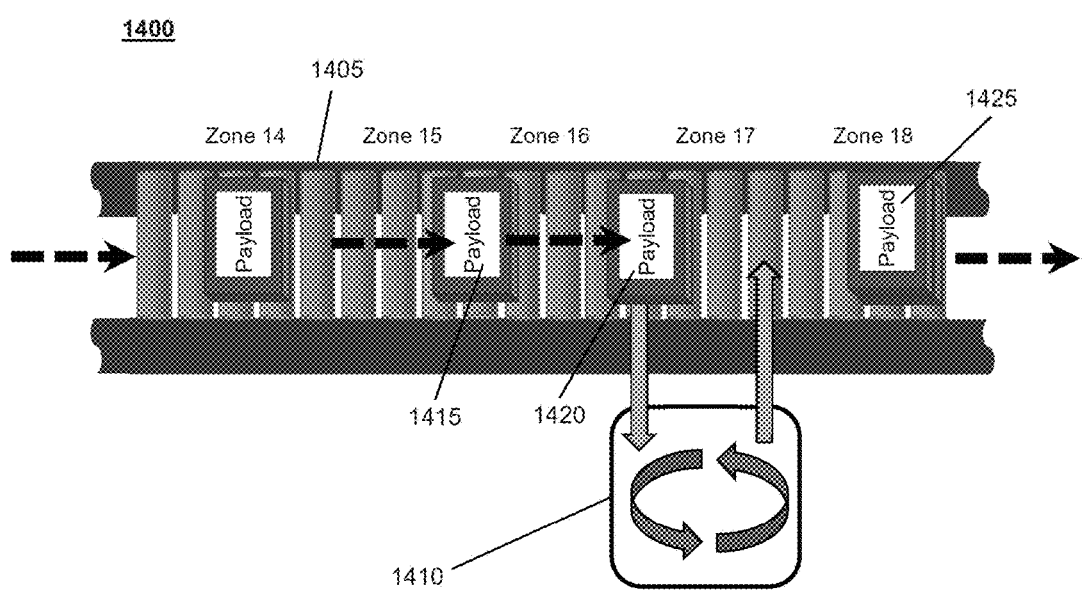
FIG. 14 is an illustration of a second alternative conveyor system.

Another example is shown in FIG. 14. This involves a wrapping machine 1410 that processes payloads are they move down the conveyor 1405. The machine takes two payloads 1415 and 1420 from the conveyor, stacks them together, and binds them with plastic film as one unit 1425. Then it places the pair back onto the conveyor. Zone 14 holds payloads until signaled by the wrapping machining 1410 that it is ready to process two more payloads. The logic equations would look like the following.

IF Wrapping machine signals ready to process 1410 AND Zone 15 controller state is EMPTY AND Zone 16 controller state is EMPTY THEN Zone 14 release 2 payloads.

Concurrently the wrapping machine 1410 interfaces to Zone controller 17. Zone 17 must not let payloads leave its zone until the wrapping process is complete. Payloads enter and are picked up by the wrapping machine 1410. When wrapping is complete, the double payload 1425 is placed onto the conveyor. For Zone controller 17 the logic would be.

IF the wrapping machine 1410 signals the process is complete AND ZONE 17 controller state is full THEN move payload 1425 out of zone 17

In this embodiment, the conveyor system includes a configuration tool that allows a user to enter the desired logic equations and transmit them to the desired zone controller.

For example, a user may enter the logic equations using a computer that is connected to the global network. In this embodiment, the computer is running a program having a user interface for entering the logic equations, a pseudo code generation module for generating pseudo code from the logic equations and a communication module that transmits the pseudo code to the appropriate zone controller. The pseudo code generation module is configured to analyze the logic equation input by the user and produce an intermediate code representation that can be transmitted to the appropriate zone controller. In the illustrated embodiment, the pseudo code is an intermediate code representation of the logic equation that can be readily parsed and converted into a zone controller command at the zone controller level.

In this embodiment, each zone controller includes in its programming an interpreter module that receives the pseudo code (or intermediate code representation) and converts it into a command appropriate for that zone controller. For example, the interpreter module may parse through the pseudo code and produce a corresponding command in a format specific to the zone controller. The command is then stored in memory and is executed repeatedly during operation. The use of pseudo code as an intermediate allows the pseudo code generation module of the configuration tool to generate an intermediate code representation that does not need to vary from zone controller to zone controller to accommodate different types of zone controllers. For example, in some applications, the zone controller system may include different types of zone controllers that implement commands in different formats. By using a universal intermediate code representation, the process of converting the Boolean logic equation into a command format appropriate for a specific zone controller is carried out at the zone controller level. As a result, appropriate commands can be generated by providing each zone controller with an appropriate interpreter module that converts the intermediate code representation into the required command format for that specific zone controller. This is not, however, strictly necessary. As an alternative, the configuration tool may be configured to convert the user input logic equations directly into zone controller commands, which can be transmitted to and stored in memory on the appropriate zone controller.

The present invention may also be configured to self-repair of existing zone controllers and automatic configuration of replacement zone controllers. A newly installed conveyor zone control system must be configured to operate properly. A set of parameters in each zone controller are selected so that the desired actions occur at run time. These include the setup of inputs, outputs, special operating modes, logic equations and potentially many more. The options are stored in non-volatile memory, and protected from being erased during power-down situations. In the case where a zone controller should stop working, it might be necessary to replace it with a new zone controller that is un-programmed. Normally this requires an off board programming tool be connected to the system to configure the replacement controller with the parameters of the old unit. This is a time consuming and a detailed operation that would like to be avoided.

Figure 11:
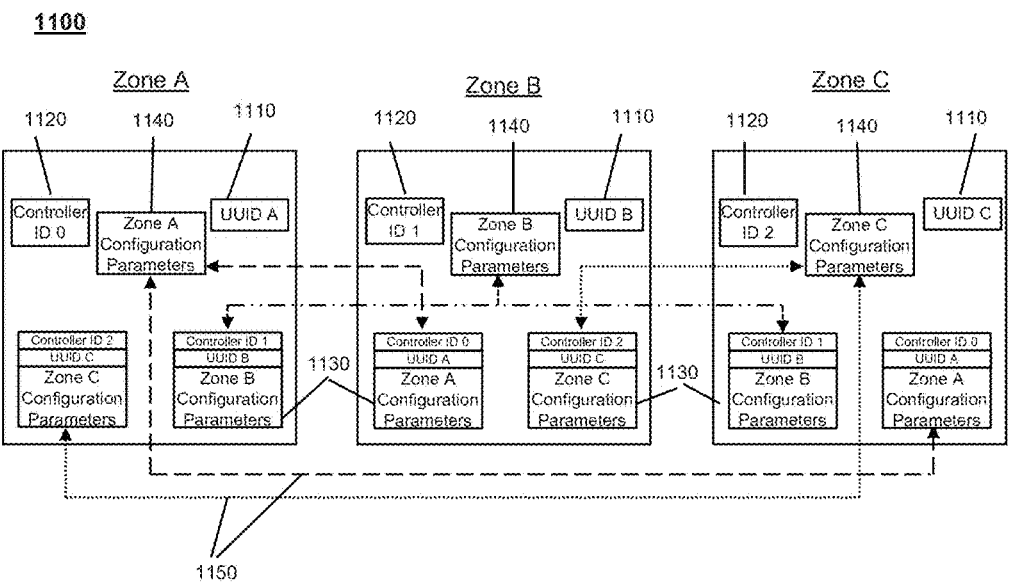
FIG. 11 describes how the zone controller configuration parameters are shared with its adjacent neighbors.
Figure 12:
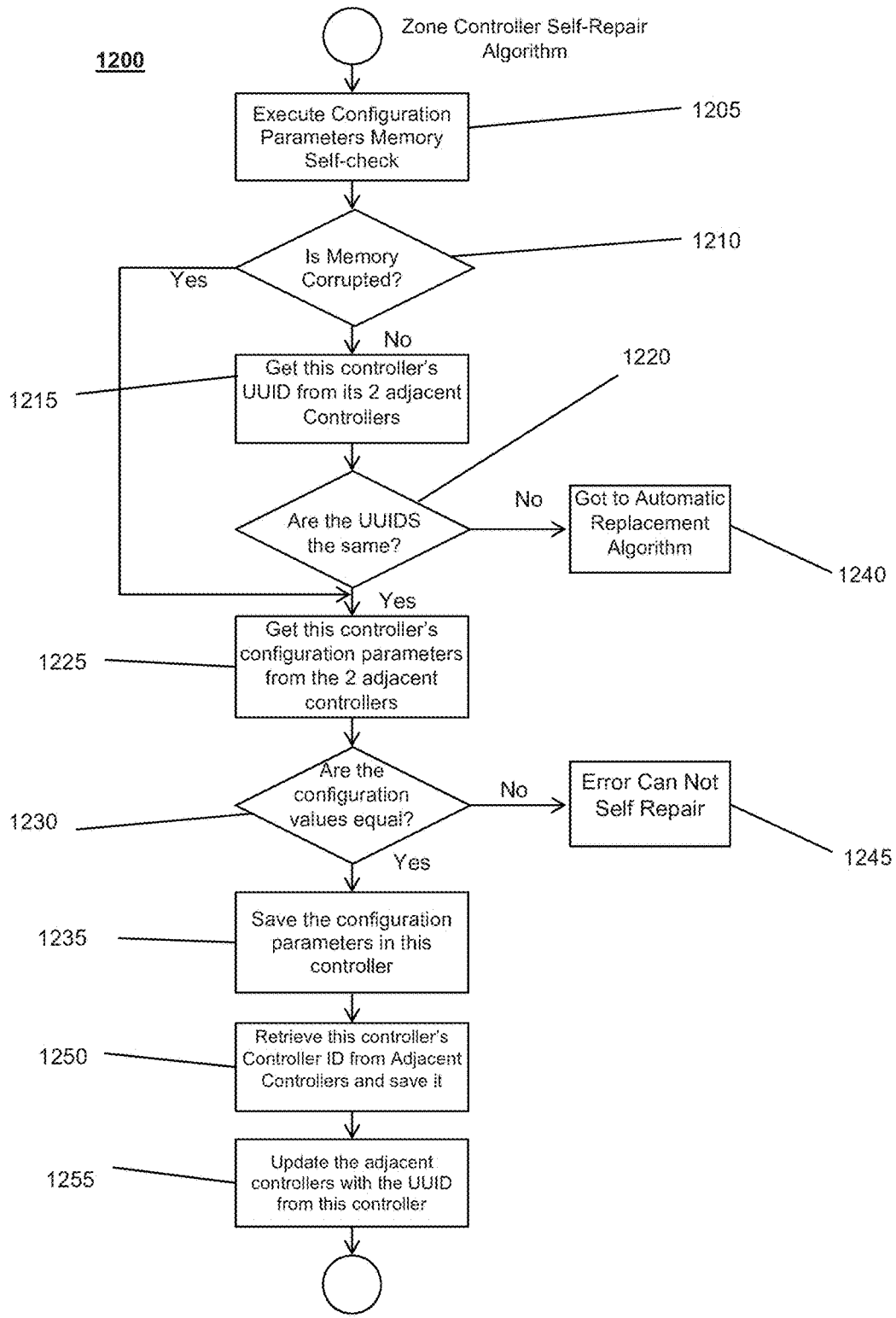
FIG. 12 is a flow chart describing the decision making that takes place when self-repairing a controller.
Figure 15:
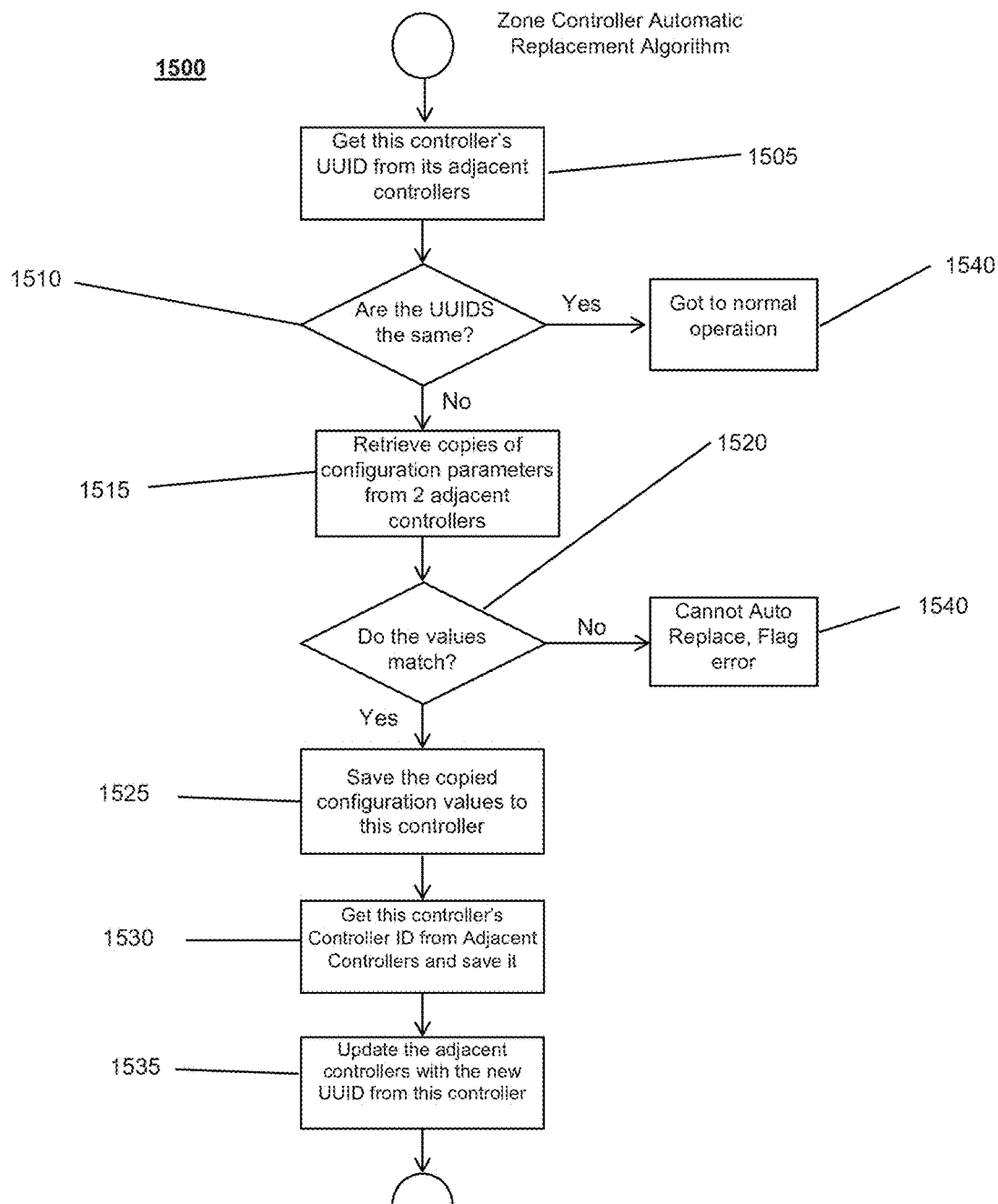
FIG. 15 is a flow chart describing the decision making that takes place when automatically replacing a controller a controller.

If desired, the present invention may provide self-repair and automatic configuration functions. These features are described with reference to FIGS. 11, 12 and 15. With the use of the local and global communication bus networks, this setting of the parameters is unnecessary. Every zone controller produced is assigned a Universally Unique Identifier 1100 (UUID) that identifies it. No two physical controllers have the same UUID assigned to it. At configuration of the zone controller system, each zone controller of the illustrated embodiment is given a Controller ID 1120 that identifies it on the global bus network. This Controller ID is used to identify each zone controller at configuration, as well as to identify the periodic zone controller status broadcast on the global bus network at run time. The Controller ID 1120 can be changed if zone controllers are added or removed at a later time. The UUID 1110 is fixed in the hardware design (typically contained in non-volatile memory) and can never be changed.

At system configuration, each zone controller in the system is configured using an off board configuration tool. Parameters are set for the specific controller, and when completed are stored in the zone controller's non-volatile memory. These parameters are referenced at run time of the controller's firmware. For example, the firmware program will refer to a counter that was setup as a parameter that counts the number of payloads for release. After the parameters are stored in the controller's non-volatile memory, a copy of the parameters 1140 is also transmitted over the local bus network to its adjacent neighbors 1130. It also sends its Controller ID and UUID as part of the data package. In the case of the two end controllers, the global bus network 1150 is used to exchange configurations between the end controllers which complete the ring. So after configuration and saving it, each zone controller's configuration data (referred to collectively as "configuration parameters"), Controller ID and UUID is stored in three locations: 1) the zone controller itself, 2) the adjacent upstream zone controller, and 3) the adjacent downstream zone controller.

At every power up, self-check 1205 diagnostics executing in each zone controller checks its configuration parameters for the corruption of data. A Cycle Redundancy Check (CRC) on the data compared to the last CRC stored shows if the data is corrupted. If a corruption 1210 occurs, the zone controller will try to repair its configuration parameters. It does this by retrieving the copies of its configuration parameters from its two adjacent neighbors 1225. It compares the two sets of configuration parameters 1230 to see they are identical, and if so, the zone controller will repair itself by saving those configuration parameters 1235. As a precaution to memory being corrupted, it also retrieves the Controller ID from its adjacent controllers and saves it 1250. It also updates the adjacent controllers with this controller's UUID 1255. If memory is not corrupted 1210, it also confirms its UUID 1215 with its two adjacent neighbors. A different UUID usually represents that the controller may have been replaced. The flow will move to the automatic replacement algorithm 1240 and 1500.

Replacing a bad controller goes through a similar set of actions. Assume that we have a non-functional zone controller that has gone bad (flashing red light) or dead (no power light). It must be replaced. We want to avoid having to connect the off board configuration tool. Power is removed and the bad zone controller is replaced with another. Power is applied. The self-check diagnostics 1205 on the replacement controller may or may not show that the configuration parameters are corrupted. If no corruption is noted, it then tries to confirm its UUID with its two adjacent neighbors 1220. The UUIDs will not match. It will then got to the Zone Controller Automatic Replacement Algorithm 1500. It goes through a similar set of sequences as self-repair to retrieve its configuration and place into memory. The UUID of the replacement controller is updated in the adjacent controllers 1535. At this point the replaced zone controller is fully operational and ready for system operation.

In the illustrated embodiment, each zone controller transmits its identification (e.g. controller ID and/or UUID) to the immediately adjacent upstream zone controller and the immediately adjacent downstream controller. This is not strictly necessary and in some applications the IDs and configuration parameters may be stored in other zone controllers. Further, while the illustrated embodiment stores the IDs and configuration parameters for each zone controller in two other zone controllers, the number of zone controllers storing this information may vary from application to application. For example, the number can be increased to provide increased redundancy. As another example, the information could be stored in only one other zone controller when redundancy is not implemented.

In the illustrated embodiment, the zone controller system includes separate global and local communications systems. As an alternative, the present invention may be implemented with only a global communications system. To implement the self-repair and automatic configuration functions in a system that includes only a global communications system, it may be necessary to provide the zone controllers with additional programming to allow direct correlation between each zone controller and the one or more other controllers that store the configuration parameters, as well as the Controller ID and/or UUID, for that controller. For example, each zone controller may store a zone controller table that contains the Controller IDs and/or UUIDs for all zone controllers. The zone controller table may also identify the one or more other controllers that are used to store the configuration parameters for each zone controller. The zone controller table may be defined at initial system configuration. During use, a zone controller can use the zone controller table to look up the zone controllers to which it should transmit its configuration parameters for storage. Similarly, when a zone controller determines during self-diagnostics that a repair is required the zone controller can use the table to determine the appropriate zone controller from which to recover its configuration parameters. If the table is corrupt, the zone controller can recover a non-corrupt copy of the table from essentially any other zone controller. A similar table can be used to facilitate automatic configuration when a new zone controller is installed. For example, at start-up, each zone controller can be configured to send a start-up message containing its Controller ID and/or UUID to all of the other zone controllers over the global network. Each zone controller may be configured to compare the Controller ID and/or UUID from each of these start-up messages with the IDs included in the table. A replacement zone controller can be identified by the fact that its Controller ID and/or UUID are not included in the table. Further, the zone controller it replaced can also be identified by the fact that it did not send a start-up message. Once a new zone controller is identified, the zone controllers that stored the configuration parameters for the replaced zone controller can send the stored configuration parameters from the replaced zone controller to the new zone controller. Each zone controller can also update the zone controller table to reflect the change.

The above description is that of current embodiments of the invention. Various alterations and changes can be made without departing from the spirit and broader aspects of the invention as defined in the appended claims, which are to be interpreted in accordance with the principles of patent law including the doctrine of equivalents. This disclosure is presented for illustrative purposes and should not be interpreted as an exhaustive description of all embodiments of the invention or to limit the scope of the claims to the specific elements illustrated or described in connection with these embodiments. For example, and without limitation, any individual element(s) of the described invention may be replaced by alternative elements that provide substantially similar functionality or otherwise provide adequate operation. This includes, for example, presently known alternative elements, such as those that might be currently known to one skilled in the art, and alternative elements that may be developed in the future, such as those that one skilled in the art might, upon development, recognize as an alternative. Further, the disclosed embodiments include a plurality of features that are described in concert and that might cooperatively provide a collection of benefits. The present invention is not limited to only those embodiments that include all of these features or that provide all of the stated benefits, except to the extent otherwise expressly set forth in the issued claims. Any reference to claim elements in the singular, for example, using the articles "a," "an," "the" or "said," is not to be construed as limiting the element to the singular.

The embodiments of the invention in which an exclusive property or privilege is claimed are defined as follows:

1. A controller system for a conveyor having a plurality of conveyor zones, the controller system comprising:
    a plurality of zone controllers, each of said zone controllers associated with a separate conveyor zone of the conveyor, each of said zone controllers having a controller state;
    a global communication network joining each of said plurality of zone controllers, wherein each of said zone controllers is operable to transmit its controller state to each of the other of said zone controllers via said global communication network on a periodic basis;
    a local communication network joining each of said zone controllers to its immediately upstream zone controller and its immediately downstream zone controller, wherein each of said zone controllers are operable to monitor the controller state for the adjacent conveyor zones via the local communication network; and
    wherein each zone controller is capable of operating based on the controller states of all other zone controllers in said global communication network and wherein each zone controller stores configuration parameters of its immediately upstream zone controller and its immediately downstream zone controller as received over the local communication network, and wherein each of said zone controllers is configured to:
        recover its configuration parameters from its immediately upstream and downstream zone controllers over the local communication network,
        compare the configuration parameters recovered from the immediately upstream zone controller with the configuration parameters recovered from the immediately downstream zone controller, and
        reconfigure itself to include the recovered configuration parameters if the configuration parameters recovered from the immediately upstream zone controller match the configuration parameters recovered from the immediately downstream zone controller,
    wherein said global communication network is a global CAN bus network and each of plurality of said zone controllers is joined to said CAN bus network using a wired connection, each of said plurality of zone controllers includes a microcontroller, a CAN controller and a CAN transceiver and is configured to continuously monitor global communications and to store in memory the controller states upon which operation of said zone controller depends.

2. The controller system of claim 1 wherein each of said zone controllers is joined to an immediately upstream zone controller via a first direct one-to-one communication channel and to an immediately downstream zone controller via a second direct one-to-one communication channel.

3. The controller system of claim 2 wherein each of said zone controllers transmits its controller state to said immediately upstream zone controller via said first direct one-to-one communication channel and to said immediately downstream zone controller via said second direct one-to-one communication channel.

4. A zone controller system for a conveyor system having a plurality of conveyor zones, the zone controller system comprising:
    a plurality of zone controllers, each of said zone controllers associated with a separate conveyor zone of the conveyor system, each of said zone controllers configured to operate in response to zone controller commands;
    a configuration tool having a user interface to permit a user to enter a Boolean logic expression to dictate operation of a zone controller, such that each of said plurality of zone controller are programmable using Boolean logic, said configuration tool having an intermediate code generator that produces an intermediate code representation of said Boolean logic expression; and
    a global communication network joining said configuration tool to at least one of said zone controllers, each of said zone controllers being configured to transmit a controller state to each of the other of said zone controllers over the global communication network on a periodic basis, said configuration tool having a communication module for communicating said intermediate code representation to at least one of said zone controllers;
    a local communication network joining each of said zone controllers to its immediately upstream zone controller and its immediately downstream zone controller, wherein each of said zone controllers are operable to monitor the controller state for the adjacent conveyor zone via the local communication network;
    wherein each of said zone controller includes a command generator module configured to parse said intermediate code representation and generate a corresponding command specific to said zone controller, said zone controller including memory for storing said zone controller command and a processor for repeatedly executing said command during operation, and wherein each of said zone controller stores configuration parameters of its immediately upstream zone controller and its immediately downstream zone controller as received over the local communication network, and wherein each zone controller is configured to:
        recover its configuration parameters from its immediately upstream and downstream zone controllers over the local communication network,
        compare the configuration parameters recovered from the immediately upstream zone controller with the configuration parameters recovered from the immediately downstream zone controller, and
        reconfigure itself to include the recovered configuration parameters if the configuration parameters recovered from the immediately upstream zone controller match the configuration parameters recovered from the immediately downstream zone controller, wherein said global communication network is a global CAN bus network and each of said zone controllers is joined to said CAN bus network using a wired connection, each of said plurality of zone controllers includes a microcontroller, a CAN controller and a CAN transceiver and is configured to continuously monitor global communications and to store in memory the controller states upon which operation of said zone controller depends.

5. The zone controller system of claim 4 wherein said configuration tool in running on a computer joined to the global communication network.

6. The zone controller system of claim 4 wherein said configuration tool is configured to allow said Boolean logic expressions to include as variables said controller states of said zone controllers.

7. The zone controller system of claim 6 wherein each zone controller has a zone state that is determined as a function of said controller states.

\* \* \* \* \*